United States Patent
Robb

(10) Patent No.: US 7,848,984 B1
(45) Date of Patent: *Dec. 7, 2010

(54) METHOD AND SYSTEM FOR COLLABORATING ADVISORS

(75) Inventor: Paul H. Robb, Tucson, AZ (US)

(73) Assignee: Collaborate Solutions Inc., Tucson, AZ (US)

( * ) Notice: Subject to any disclaimer, the term of this patent is extended or adjusted under 35 U.S.C. 154(b) by 742 days.

This patent is subject to a terminal disclaimer.

(21) Appl. No.: 09/732,008

(22) Filed: Dec. 8, 2000

Related U.S. Application Data

(60) Provisional application No. 60/210,460, filed on Jun. 9, 2000.

(51) Int. Cl.
*G06Q 40/00* (2006.01)

(52) U.S. Cl. .................... 705/36 R; 705/37; 705/35

(58) Field of Classification Search .................. 705/35, 705/36, 26, 80, 50, 36 R; 709/24, 217, 227; 379/202.01
See application file for complete search history.

(56) References Cited

U.S. PATENT DOCUMENTS

| | | | | |
|---|---|---|---|---|
| 4,694,397 A | 9/1987 | Grant et al. | ................ | 364/408 |
| 4,742,457 A | 5/1988 | Leon et al. | ................ | 364/408 |
| 5,006,998 A | 4/1991 | Yasunobu et al. | ........... | 364/513 |
| 5,231,571 A | 7/1993 | D'Agostino | ................ | 364/408 |
| 5,606,496 A | 2/1997 | D'Agostino | ................ | 395/235 |
| 5,706,452 A * | 1/1998 | Ivanov | ................ | 345/751 |
| 5,710,889 A | 1/1998 | Clark et al. | ................ | 395/244 |
| 5,745,706 A | 4/1998 | Wolfberg et al. | ........... | 395/235 |
| 5,787,175 A * | 7/1998 | Carter | ................ | 713/165 |
| 5,819,230 A | 10/1998 | Christie et al. | ................ | 705/4 |
| 5,873,071 A | 2/1999 | Ferstenberg et al. | ......... | 705/37 |
| 5,890,129 A | 3/1999 | Spurgeon | ................ | 705/4 |
| 5,913,202 A | 6/1999 | Motoyama | ................ | 705/35 |
| 5,918,217 A | 6/1999 | Maggioncalda et al. | ........ | 705/36 |
| 5,940,843 A * | 8/1999 | Zucknovich et al. | ........ | 715/516 |
| 6,154,753 A * | 11/2000 | McFarland | ................ | 715/508 |
| 6,195,091 B1 * | 2/2001 | Harple et al. | ................ | 345/751 |
| 6,243,722 B1 * | 6/2001 | Day et al. | ................ | 715/512 |
| 6,266,683 B1 * | 7/2001 | Yehuda et al. | ............. | 715/512 |
| 6,356,909 B1 * | 3/2002 | Spencer | ................ | 707/10 |
| 6,430,542 B1 * | 8/2002 | Moran | ................ | 705/36 |
| 6,502,113 B1 * | 12/2002 | Crawford et al. | ........... | 715/530 |
| 6,551,357 B1 * | 4/2003 | Madduri | ................ | 715/512 |
| 6,581,039 B2 * | 6/2003 | Marpe et al. | ................ | 705/7 |
| 2002/0091725 A1 * | 7/2002 | Skok | ................ | 707/501.1 |
| 2003/0107587 A1 * | 6/2003 | Maritzen et al. | ........... | 345/700 |

OTHER PUBLICATIONS

Leonard et al. "The role of budget and financial reform in making government work better and cost less" Spring 1995 Public Budgeting & Finance v15n1 pp. 4-18.*
Wood, James O "Public pension plans in the third millennium" Third Quarter 1996 Benefits Quarterly v12n3 pp. 69-74.*
McMahan, Kevin L. "The Program Financial Advisor" Summer/Autumn 1998, Financier, V5N2/3, pp. 40-54.*
Paul Thurott's Wininfo, www.wininformant.com/, dated Dec. 6, 2000.

\* cited by examiner

*Primary Examiner*—Kelly Campen
(74) *Attorney, Agent, or Firm*—Pillsbury Winthrop Shaw Pittman LLP

(57) ABSTRACT

A common collaboration tool for a financial services client and authorized advisors to work together online through the common tool is provided. The tool enables a scope of authorization to be given to advisors and/or other participants for security and confidentiality reasons. The tool enables advisors (and/or other participants) to access information submitted (or authorized) by the client to collaborate as a cohesive team in sharing information, devising a plan, addressing client's concerns, drafting (or modifying) a document and performing other services for the client.

41 Claims, 7 Drawing Sheets

METHOD AND SYSTEM FOR COLLABORATING ADVISORS

CROSS REFERENCE TO RELATED APPLICATION

This application claims the benefit of U.S. Provisional Patent Application Ser. No. 60/210,460, entitled "Method and System for Collaboration of Financial Advisors," filed on Jun. 9, 2000, the contents of which are hereby incorporated by reference in their entirety.

FIELD OF INVENTION

The present invention relates to the field of collaborating resources and other information, more particularly, to a method and system for providing a collaboration tool where advisors, clients and/or other participants may access client data, exchange data with other participants and communicate with each other where consistent and accurate collaboration of resources and information may be achieved.

BACKGROUND OF THE INVENTION

On-line companies offer a variety of products and services including on-line trading; software products for sale; information on advisors in various area; advice from national experts at high profile companies; advice from in-house advisors; various financial products; and other products and services. While some of these companies also offer advice, clients generally do not have the ability to interact with multiple advisors with various areas and levels of expertise.

Generally, a client may have more than one different advisors and/or other sources of information to assist the client in managing the client's assets and other aspects of the client's life and/or business. Advisors from different disciplines that serve common clients lack a centralized tool to interact, communicate and share resources. The current industry model is hampered by a fragmented planning and implementation process, with separate advisors acting independently rather than as a collaborative team. Advisors may duplicate efforts and may rely on old or inaccurate data. Separate advisors oftentimes are unable to simultaneously access current data and historical documents pertaining to their common clients.

This is largely due to the time consuming, cumbersome and inconsistent communication methods of the existing services. The effects of this traditional system have been inefficiencies, such as missed project deadlines, uninformed team members, wasted resources, lost time and expenses, squandered planning opportunities, and frustrated and confused advisors and clients.

For example, some advisors may create work products, such as financial plans, legal documents, tax returns, financial statements etc., while others may place and/or manage products, such as investment accounts, insurance policies, annuities and retirement plans. In either case, the work being done by a particular advisor may directly or indirectly affect the other advisors working for that client. Often, advisors of a client may be from different disciplines and different firms. Generally, advisors lack a common tool to interact, communicate, and serve the client in a coordinated manner. Currently, there is no common place where the clients financial history, for example, resides to insure informed decision making and effective implementation rationale. This is a liability for both clients, advisors, and other participants.

Electronic information processing and communication systems are playing an increasingly important role in coordinating business operations among various participants in a community (e.g., the financial community). Among other functions, these technologies may be utilized for coordinating administrative operations, disseminating information or documents for review and retention, individual access to investment information, reference and research libraries and providing information inputs for ongoing financial, legal, investment and other support and functions. Currently, these activities are disjoint and provided independently of each other. In addition, many vital services and activities as well as important investment and/or reference information are not provided in an automated way. Client/advisor history is typically kept in offline data storage and is cumbersome to review and disseminate. Further, the client to advisor interaction suffers from much lost productivity and opportunity due to delays in communication and coordination between the parties (particularly in cases where many advisors are to be included on the clients' support team). With the advent of multiple discipline practices in the advisor and other communities, many of these issues may become exacerbated due to lack of consistency and standardization.

These and other drawbacks exist with current systems.

SUMMARY OF THE INVENTION

The present invention provides a method and system for providing collaborative environments for advisors, their clients and other participants to interact, communicate and exchange data and information. Other features and options are also available.

The present invention enables a client to authorize selected advisors as well as other participants to view, discuss, modify and perform other operations in response to the client's request for services. A client may define the scope of authorization for advisors and/or other participants for security and confidentiality reasons. Security features may be implemented to permit safe communication through the Internet to multiple distinct advisors, clients and other authorized participants. Advisors (and/or participants) may then access information submitted (or authorized) by the client to collaborate as a cohesive team in sharing information, devising a plan, addressing client's concern, drafting (or modifying) a document and performing other services for the client. The present invention provides a mechanism to implement planning in an organized and efficient manner, by promoting consistent and accurate collaboration of resources and efforts.

The present invention provides a common collaboration tool to interact, communicate and serve the client in a coordinated manner in various areas of interest. A common repository for organizing and maintaining a client's history may be managed by the collaboration tool of the present invention to insure informed decision making and effective implementation rationale. As a result, advisor interaction, efficiency, profitability, client satisfaction, and increased earnings may be realized.

For example, advisors may include accountants, attorneys, financial planners, insurance agents, investment advisors, trust officers, and charitable officers. Other entities with experience and/or knowledge of a particular area of interest may be considered an advisor.

The present invention may enable the advisor community to leverage their resources and compete successfully thereby retaining existing and attracting new market share. By using the present invention to collaborate, advisors may be able to retain their separate identities, while partnering with other firms to expand and diversify their revenue sources.

The present invention enables advisors, clients and other participants to view and modify various documents and work products pertaining to a client's planning process remotely through the Internet. Other forms of access are also available. According to an embodiment of the present invention, the technology of the collaboration tool does not require separate software or the purchase of any additional components by advisors, clients or other participants who already have Internet access. Thus, member advisors and their clients may have access to sophisticated web enabled planning software, which may be unavailable and/or unaffordable to some advisors. This enables advisors to offer a value-added technology and service to selected clients. Each member of the planning team may review and/or update only those documents for which they have been granted authorization. Since access to the planning deliverables is easy to accomplish, additional advisors may be added to the process whenever their area of expertise is needed, avoiding the geographic and scheduling constraints of existing business models. All plans and documents may be retained permanently and made accessible to a team of advisors and/or participants for future reference of the client's planning implementation history and rational. In addition to working on or viewing documents and client data independently, the whole team may work together in collaboration using virtual office tools and other techniques. These tools may implement a wide variety of collaborative approaches, such as real time live video conferencing, for example.

The effective application of these technologies into the mature vertical market of the various services and other industries may result in cost savings, increased productivity and higher revenue potential. Other advantages may also be realized. The present invention provides a mechanism to implement planning in an organized and efficient manner, by promoting consistent and accurate collaboration to augment in person meetings.

According to an embodiment of the present invention, each advisor and/or other participant using the present invention may pay a subscription fee for the use of software and the collaborative site, in addition to fees based upon the number of clients for whom they make the tool available. Other business models may also be implemented.

Other objects, features and advantages of the present invention will be apparent through the detailed description of the preferred embodiments and the drawings attached hereto. It is also to be understood that both the foregoing general description and the following detailed description are exemplary and explanatory and not restrictive of the scope of the invention.

DETAILED DESCRIPTION OF THE PREFERRED EMBODIMENTS

Generally, individuals and businesses work with advisors of various disciplines in planning and managing areas of business and other areas, such as finances, personal affairs, etc. The present invention provides various collaborative features, which may include connecting some or all of the client's advisors and other authorized participants, tracking work in process, creating a central client history, monitoring various aspects of a client which may include financial and other assets, and building a synergistic collaborative team out of distinct independent advisors. The present invention may provide advisor benefits including immediate data and document access, reductions in data gathering duplication, low cost quality software access, faster project completion and fee/commission turnaround, referral opportunities from networked teams, efficiency from collaboration yield less time/revenue event, higher client volume, higher earnings, and more commission. The present invention may also provide client benefits including immediate data and document access, reduction in data disclosure duplication, better reports and service, faster project completion, less costs, better and more comprehensive advice, efficiency from collaboration yielding reduce client time spent, lower client fees, better understanding, and better satisfaction. As a result, client and advisor relationships are established and enhanced.

The collaborative features of the present invention may be applied to other areas of interest as well, where multiple entities may be involved in providing information and other services. Examples may include a collaboration of a client's financial advisors, medical advisors (e.g., doctors), educational advisors (e.g., teachers, counselors, etc.) and others. Also, other projects with multiple consultants and/or participants providing a service to a client may also utilize the collaborative features of the present invention.

Figure 1:
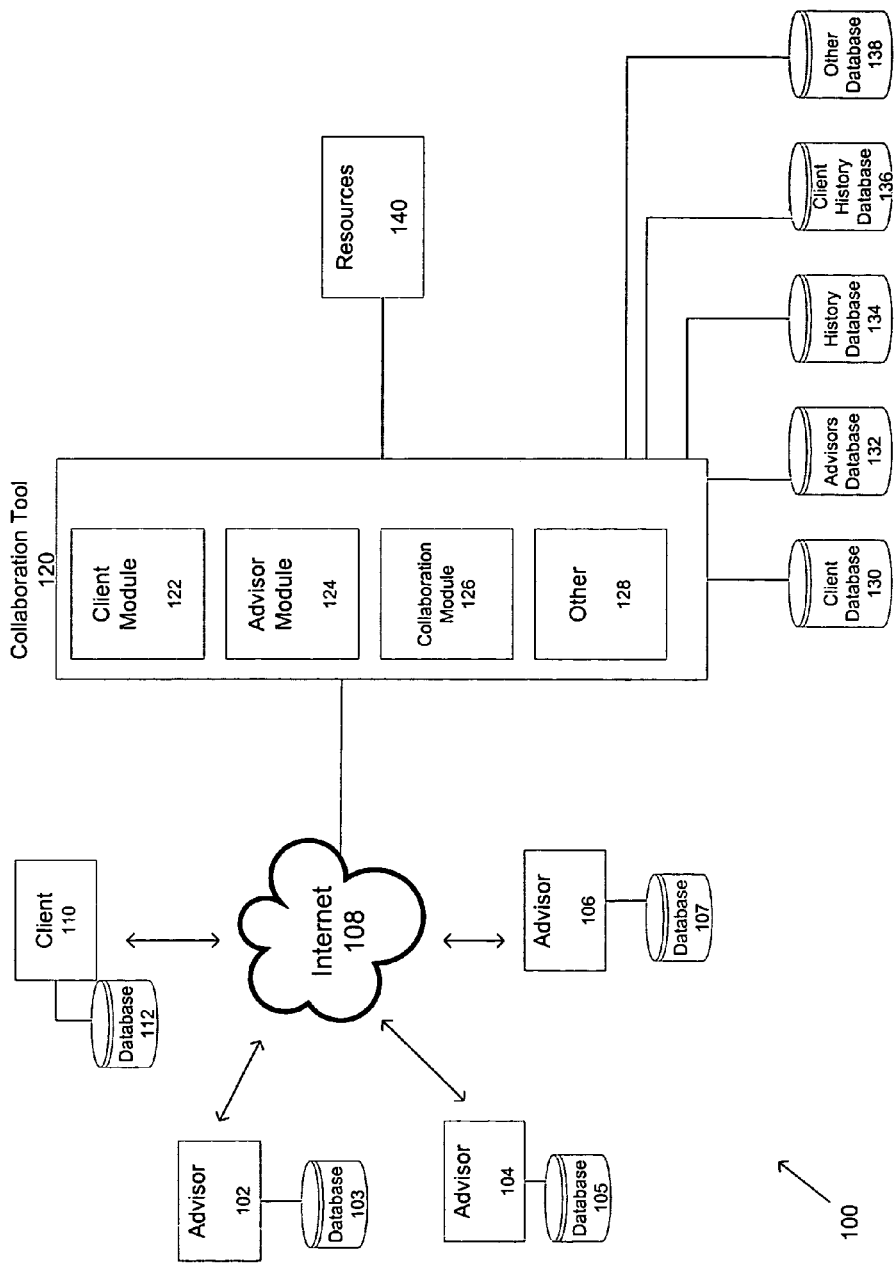
FIG. 1 is a diagram of a system for collaborating participants, according to an embodiment of the present invention.

FIG. 1 is an example of a system 100 for collaborating a client, associated advisors and/or other authorized participants, according to an embodiment of the present invention. Client 110 may access collaboration tool 120 through Internet 108 or other mechanism. Likewise, advisors and/or other authorized participants, 102, 104, and 106 may also access collaboration tool 120 through Internet 108 or other mechanism. In particular, the advisors (or authorized participants) 102, 104, and 106 may communicate with client 110 as well as each other through password protected forums to retrieve various documents and information from fellow advisors (or participants) and/or from client 110 through collaboration tool 120 of the present invention.

In addition, the various advisors (or participants) 102, 104, and 106 may further maintain respective databases 103, 105 and 107 regarding the client, information regarding specialized areas, and other relevant information. This information may be stored remotely or within local advisor (or participant) databases. Further, client 110 may also maintain databases (e.g., database 112) to store personal and other relevant information related to various areas of interest.

Databases may be, include or interface to, for example, the Oracle' relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

An advisor may include an individual (or entity) with some type of accreditation in an area of specialty, such as a CPA, financial planner or attorney. Advisors typically either work as sole proprietors, with small firms, with large firms, or with very large international firms. For example, advisor areas may include Financial Planning; Accounting; Insurance; Law; Investments; Trust Officers; Estate Planners; Charitable; Securities; Investment Services; and others. Some advisor areas may have multiple accreditations. Advisors may also address other aspects of a client's personal or business dealings (or affairs). For example, an advisor may include a physician (e.g., doctor, dentist, specialist, etc.) or other entity with experience or expertise in an area of interest.

A participant may be an entity (e.g., individual or a group) that has been granted authorization by a client or other associated entity to view, analyze and/or provide guidance, information, advice, etc. through the collaboration tool of the present invention. Other participants may also utilize the collaborative tool of the present invention, such as associates of the automotive industry, construction industry, education industry, philanthropy and other industries and areas of interest.

Clients may include individuals, families, groups and companies that have one or more services performed by one or more advisors and/or participants. Services may include information retrieval and dissemination of advice. For example, in the financial service provider industry, individual clients may be typically identified by categories such as total assets, annual income, net worth, or via age bracket specialties. Company sales or number of employees may be identified by corporate clients.

In the financial industry, for example, advisors may access the client's financial plan, exchange data, view investments, and communicate using chat rooms, bulletin boards and other modes of communication. Also available are education and interaction in separate advisor and client communities where tools are available to monitor client's finances, manage the advisor's practice and perform other operations.

Collaboration Tool 120 of the present invention may provide various modules and/or pages of information. For example, collaboration tool 120 may enable access to client module 122, advisor module 124, collaboration module 126 and other modules 128. Various information may also be stored through collaboration tool 120 (or through a remote storing facility). For example, collaboration tool 120 may maintain client database 130, advisor database 132, history database 134, client history database 136 and other database 138. For example, client database 130 may contain client information, such as personal information, authorized advisors (and/or participants), authorization information, personalized preferences and other information. Advisor database 132 may contain advisor information, such as associated clients, authorization information, contact information and other information. History database 134 may contain history information, such as document (and other work product) edits, date/time of edits, author of edits, type of action taken, and other information. Client history database 136 may contain client history information, such as associated advisors, actions taken by advisors, client work product (e.g., documents), updates and other information. Other databases may store and organize other information, in accordance with the present invention. Also, the databases may remain separate or may be combined as one database. Other variations and storage options may be implemented.

The collaboration tool 120 of the present invention may also retrieve information from resources 140, which may include various entities, such as films, banks, and/or other companies that may provide relevant information to advisors, clients and/or participants.

Figure 2:
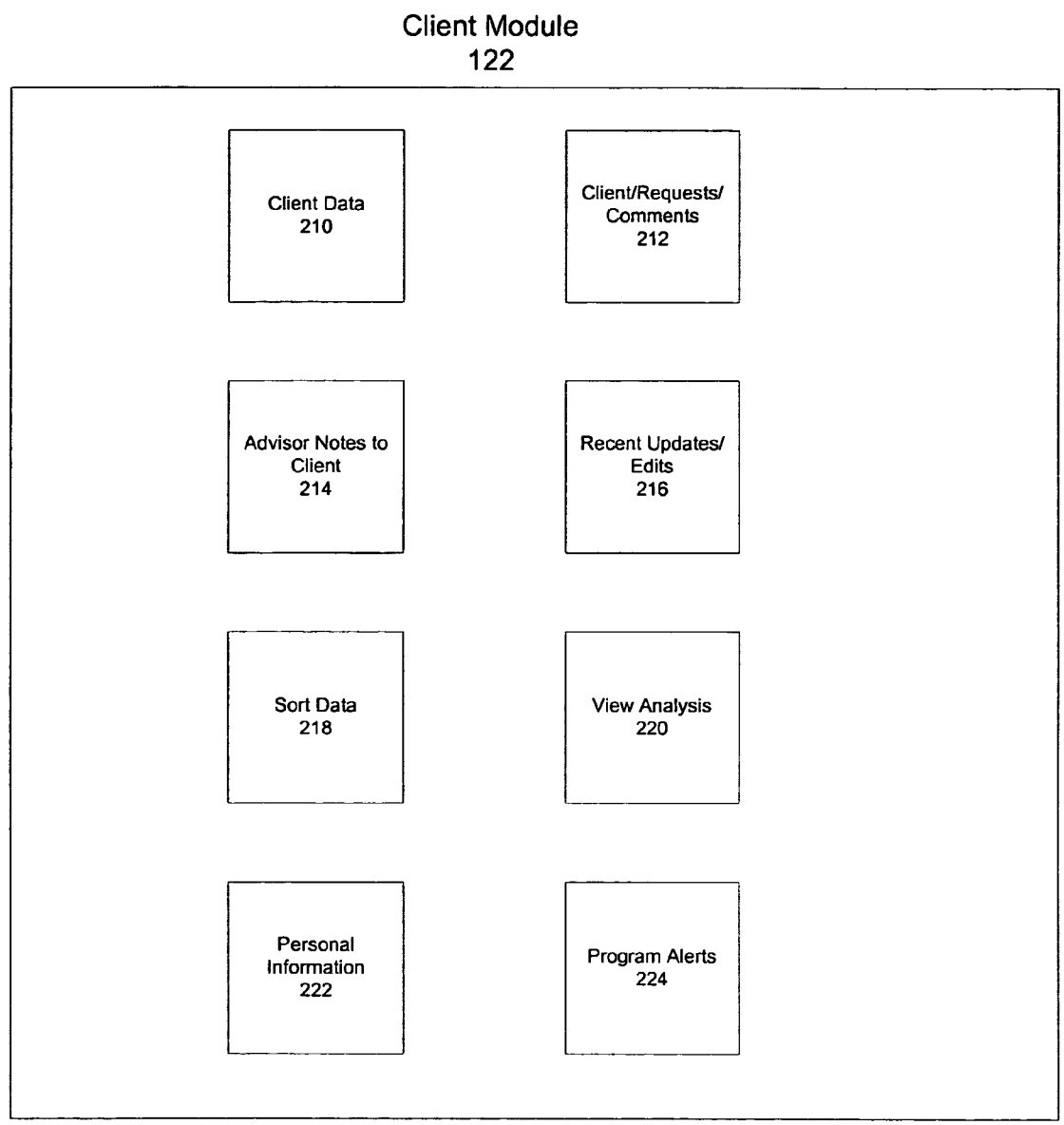
FIG. 2 is an example of a client module, according to an embodiment of the present invention.

FIG. 2 is an example of a client module, according to an embodiment of the present invention. Client Module 122 may provide various information to the client and/or other associated entities that are authorized to access client information. The present invention enables clients to create and/or review work products and other specific data/information. The present invention further enables clients to define data level access security rules for advisors and/or participants. For example, specific advisors or groups of advisors may be given access to a particular document, category of information or based on other user-defined criteria.

Client data may be viewed at 210, which may include personal data and other related client information. A client may submit questions, requests and/or comments to all or some participating advisors and/or participants at 212. For example, the client may request a specific advisor to update a file or make changes to a document. At 216, a client may view recent updates/edits made by the client's associated advisors and other authorized participants regarding specific matters of interest. In addition, a client may view the frequency of visits, types of edits by a selected one or more advisors and/or participants and other information. The client may select to view update information pertaining to individual advisors and/or participants or view all updates/edits made within a defined period of time. At 218, the client may input (or select) factors by which to sort data that may be viewable on the client module of the present invention. For example, data may be sorted by date made, by which entity, which product, etc. Other variations may also be made available.

At 220, the client may view a summary and/or detailed view of analysis and other information provided by associated advisors and/or participants. The client may select one or more specific advisor (and/or participant) or the client may view all analysis information provided by all participating advisors (or participants). Other viewing selections may also be available.

Client defined personalized information may be displayed at 222. For example, a client may view stock tickers for stocks that the client has invested in or has otherwise expressed interest. The client may also view press releases for selected subjects and topics of interest. Other newsworthy information may also be displayed. A client may define other areas of interest for display in 222.

A client may define personalized alerts for client defined triggering events at 224. For example, when an advisor (or other participant) performs a certain action, the client may receive notification. For example, when an advisor (or participant) views, edits, or performs other operations, the client may receive immediate notification. Also, when an identified advisor views information regarding the client, notification may be sent to the client. The client may define the form of notification, which may include email, text messaging, voicemail, phone call, or other form of communication. Further, the user may define different methods of notification for different triggering events. This feature of the invention ensures that the client is consistently updated and notified of actions affecting the client (or otherwise flagged as being important to the client).

Figure 3:
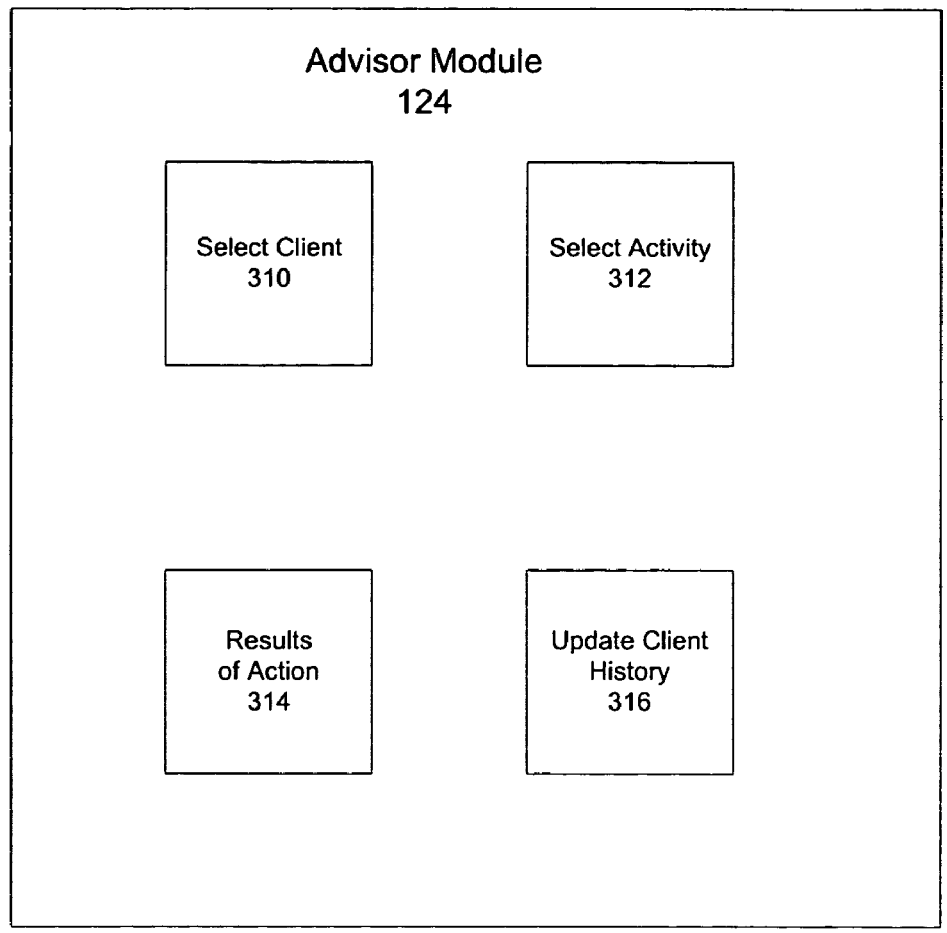
FIG. 3 is an example of an advisor module, according to an embodiment of the present invention.

FIG. 3 is an example of an advisor module, according to an embodiment of the present invention. Advisors and/or participants may create and/or review work products including documents and other information relevant to the client. The present invention enables advisors to import or export work products created/maintained externally into or out of the system.

An advisor (or participant) may select a client of interest, at 310. Oftentimes, an advisor may have multiple clients in varying geographic locations with different requests for services. The present invention enables advisors (or participants) to group and/or categorize clients (and other information) for management purposes. The advisor may select from a list of clients where the clients have given authorization to the advisor to access the client's data. At 312, the advisor (or participant) may select one or more activities. An activity (or action) may involve a process to be performed for the selected one or more clients, which may involve building/modifying a plan (e.g., financial plan), providing advice regarding an issue, creating/modifying a document, etc. At 314, the advisor may view results of the action, which may include answers, comments and other information from the client or other participating advisor(s) and/or participant(s). At 316, the client history and/or other databases may be updated to ensure accurate information for other advisors to access.

Figure 4:
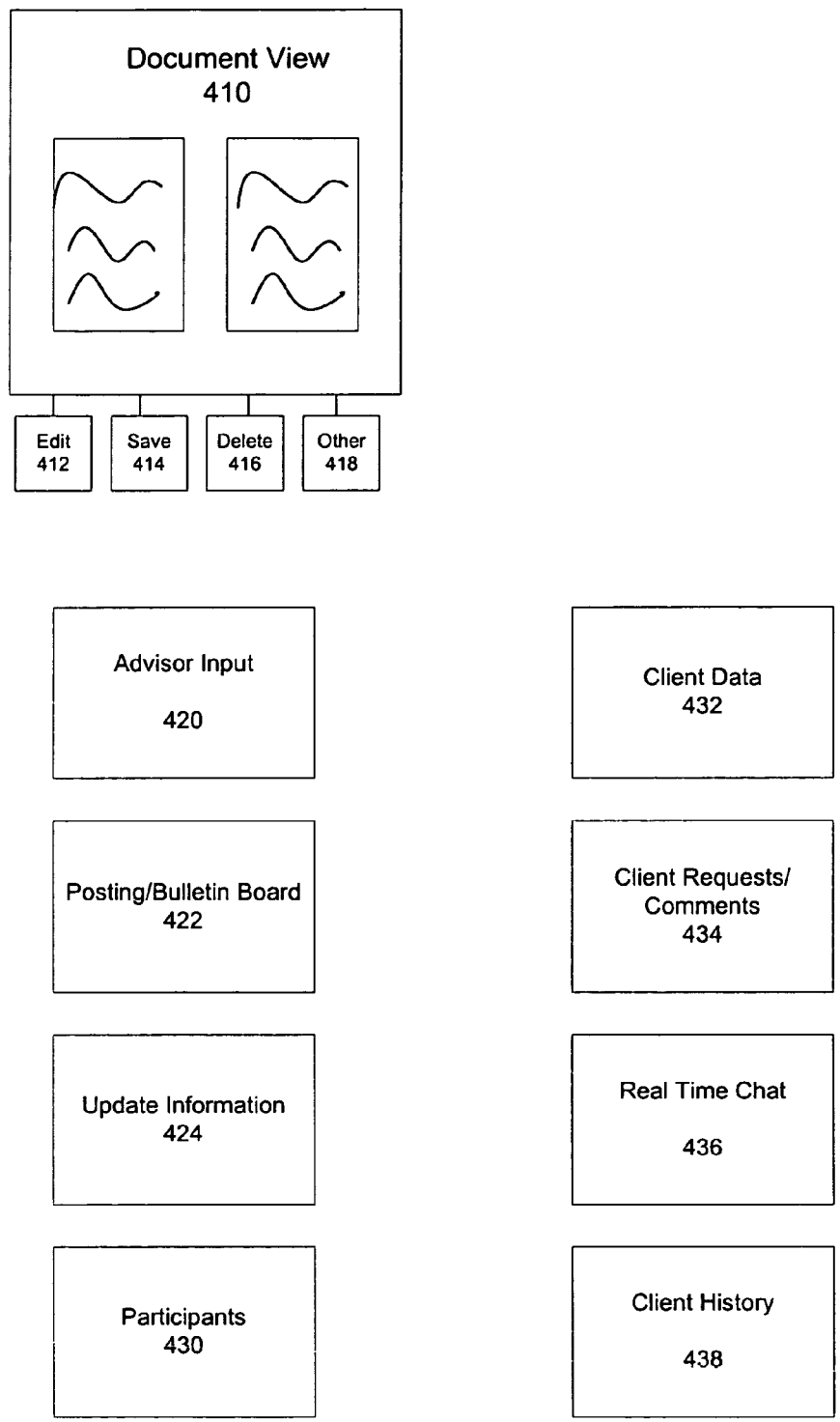
FIG. 4 is an example of a collaboration module, according to an embodiment of the present invention.

FIG. 4 is an example of a collaboration module, according to an embodiment of the present invention. Collaboration module 126 provides clients, advisors, participants and other authorized entities the ability to converge resources, interact and communicate with each other, unify information, and perform other activities, in accordance with the present invention.

Document view 410 enables authorized entities to view a selected document from a database or other source. A participant may perform various operations, such as edit 412, save 414, delete 416 and other operations 418. This feature of the invention enables documents to have the same edits thereby minimizing inconsistencies, inefficiencies, confusion and duplicative efforts. Often, an entity may make modifications to a document, only to realize that another entity had already made the same or similar modifications. The collaborative module of the present invention minimizes duplication of efforts by providing a central repository of documents that may be viewed and/or modified by various advisors addressing various aspects of a client's business, assets and personal business. The accessed documents (or other work product) may be uniform and updated for all who consult these documents. Thus, the information relied upon may be consistent for all advisors for a client.

Advisor Input 420 enables advisors and/or participants the ability to provide information that may be relevant to other aspects of a client's business, assets and/or personal business. Other areas may also be affected. In addition, posting 422 may provide a bulletin board where various advisors and other participants may provide information and comments. This enables other advisors to become aware of changes made by a client (or other authorized entity) that will affect another advisor's responsibilities to the client.

Update information 424 may provide information related to advisor or participant updates. For example, if an advisor makes modifications to a document, update information 424 may provide a summary or detailed description of the modifications made by that advisor and other advisors. Other specifics may also be displayed. Also, when a document is accessed, various edits (including deletions, additions, etc.) may be displayed in a manner to designate that a particular advisor has made certain edits. For example, edits made by a financial planner may be displayed in a unique color, unique font or other unique manner.

Participants 430 provides information related to which entities have been given authorization to the client's information. Participants 430 may provide a list of advisors and/or participants that the client has authorized to view and analyze the client's matters. Further links to other databases and other advisor information may also be provided at 430.

Also, the scope of authorization for each advisor (or participant) may also be displayed.

A summary or detailed description of the client may be displayed at client data 432. Client Data 432 may provide client information that may be relevant and/or useful in analyzing, viewing client matters and/or documents. At 434, client requests, comments, and/or questions may be displayed. This information may be obtained through module 212, which may be entered through client module 122. Also, the client may update requests, comments, and/or questions as new information is received.

Chat board 435 enables advisors and other participants (e.g., client and others) to engage in a real time conference where information and ideas may be exchanged. Client History 438 may provide summary and/or detailed information related to a client's historical information which may include previous edits and/or other transactions. This feature of the present invention provides a mechanism for tracking actions by advisors and other participants. Trends and results may also be viewed through Client History 438.

Figure 5:
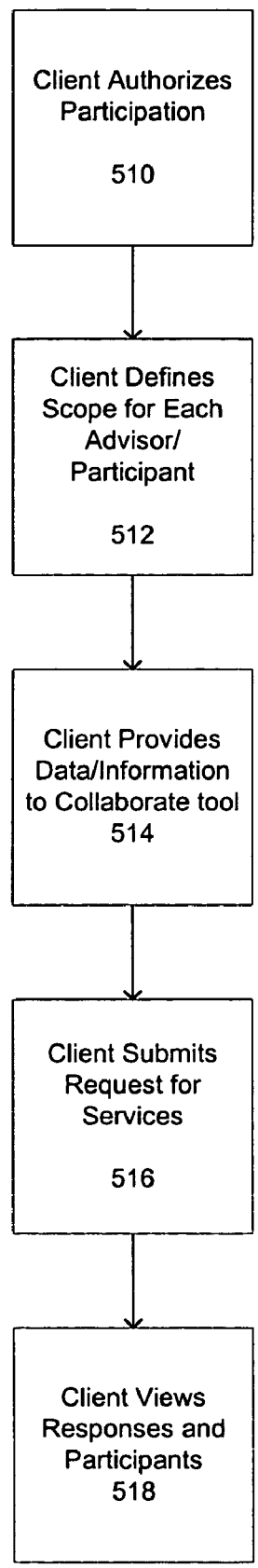
FIG. 5 is a flowchart of a client side process for collaboration, according to an embodiment of the present invention.

FIG. 5 is a flowchart illustrating a client side process for providing collaboration, in accordance with the present invention. At step 510, a client may authorize participation to various advisors and/or other participants. A client may identify advisors and/or participants including contact and other relevant information. In addition, the client may pre-authorize one or more advisors and/or participants. This pre-authorization feature enables a pre-authorized advisor or participant to participate through the collaboration tool of the present invention when the pre-authorized advisor is needed, which may occur at a later point in time. Triggering events may also be identified which may trigger authorization for an identified advisor and/or participant. For example, if at a later point in time, an advisor or other participant advises the client that a financial advisor is needed, a pre-authorized financial advisor may gain access immediately through the present invention. Loss of time and other inefficiencies may be minimized. Also, comprehensive results may be expedited to the client. The pre-authorization feature may also be useful in pre-authorizing an authorized advisor's colleagues, partners, and/or associates in a common firm, generally with confidentiality agreements or similar mechanism, for example. Other variations may be implemented.

At step 512, a client may define the scope of authorization for each advisor and/or participant. For example, a client may entitle certain advisors access to a specific document, type of documents, sector and other criteria. A client may define a specific folder which specific documents that an identified advisor may be able to view, analyze and/or modify. Other user defined restrictions may also be applied.

At step 514, a client may provide access to data/information to the collaboration tool. For example, this information may include documents, spreadsheets, emails, and other correspondences. The client information may be downloaded, sent electronically, faxed, scanned or conveyed by other modes of communication.

At step 516, the client may submit one or more requests for services through the collaboration tool of the present invention. At this time, the authorized advisors and/or participants may access documents and other information (within the designated scope of access) and process the client's request. At 518, the client may view responses and analysis performed by authorized entities (e.g., advisors, participants) and/or participant in the exchange of information through the collaboration tool.

Figure 6:
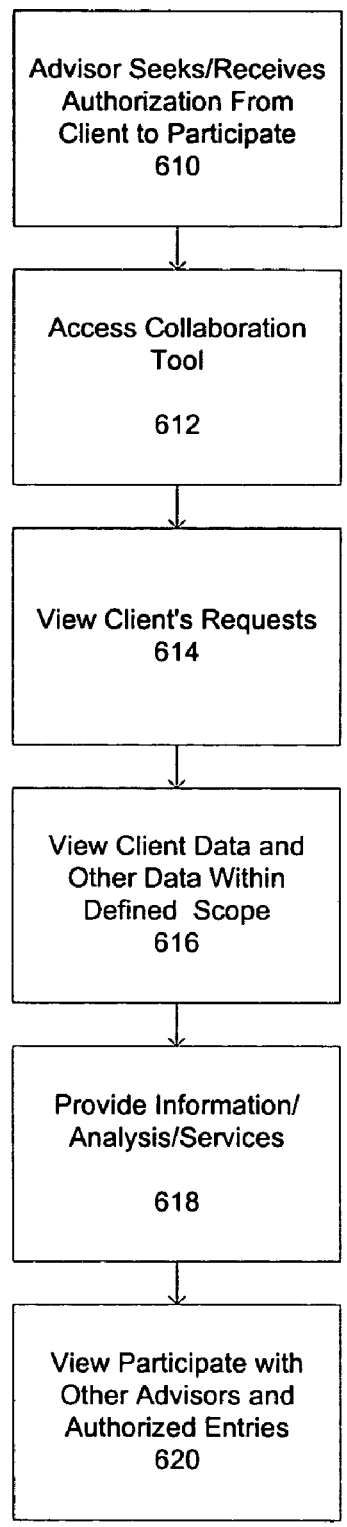
FIG. 6 is a flowchart of an advisor side process for collaboration, according to an embodiment of the present invention.

FIG. 6 is a flowchart illustrating an advisor (or participant) side process for providing collaboration, in accordance with the present invention. At step 610, an advisor may receive authorization to participate in the collaboration tool of the present invention. Also, an advisor may proactively seek authorization from a client. For example, an advisor may inform the client that to address the client's request for services, the advisor may need access to certain information. The client may then provide access to the requested information.

At step 612, an authorized advisor and/or participant may access the collaboration tool for information exchange and retrieval. At step 614, the advisor (or participant) may view the client's request and other information. At step 616, the advisor (or participant) may view client data and other data within the defined authorization scope. At step 618, the advisor (or participant) may provide information, analysis and/or other requested services to the user through the collaboration tool of the present invention. Other resources may also be consulted. At step 620, the authorized entity may view and/or participate with other advisors and authorized entities.

According to another embodiment of the invention, the present invention may reach clients by marketing to their advisors. Each advisor may maintain information relevant to client 110 at remote databases, such as 103, 105, and 107. Also, collaboration tool 120 may also maintain one or more databases (e.g., 130, 132, 134, 136 and 138) with information related to the client's activities and other activities and information. Also, collaboration tool 120 may negotiate strategic alliances and joint ventures with various resources 140, such as financial planning firms, software manufacturers, insurance companies, brokerage firms, trust banks, financial publishers and a variety of consumer financial service firms, for example. Thus, advisors may access extensive client data, as authorized by the client or other associated entity, through the present invention.

The approach of existing Internet financial service companies is to either sell products, advisors, or both directly to clients in an attempt to capture and control the client and their assets. This approach threatens existing advisors. The present invention, however, provides advisors with a competitive advantage over impending high tech firms. Also, the present invention focuses on the client advisor relationship. In building a relationship and enhancing communication and practice management tool for advisors, these advisors may efficiently network large segments of new and established clients.

The present invention provides a mechanism for advisors to create virtual multiple disciplinary practices, while maintaining their separate identity. This provides companies or firms a means to leverage resources and compete with the larger and more established firms. In particular, the added benefits of accountants, attorneys, and other entities being able to more closely collaborate on projects include project efficiency; timeliness, reduced costs and overall improved products and services.

In order to provide a comprehensive solution for information and communication needs, the present invention may provide the technical architectures to facilitate the creation of complete information management, communication and networking capabilities to enable the linking of pertinent activities (e.g., financial activities).

The present invention may functionally decompose each area of information processing and network communication and group each with similar functional components. Each group-processing component may be addressed individually, via proprietary development, partnering with "best of class" OEM vendors, or other method. Then, each group's unique blend of technical solutions may then be integrated. As a result, each functional processing unit may have a technical solution specifically designed for its unique requirements.

At a high level overview, financial processing units may include categories, such as Collaboration Services; Client Community Services; Advisor Community Services; Site Support Services and other categories, for example.

Each specific requirement may logically fit under one or more of these and other primary categories. For example, Financial Planning, Estate Planning and Practice Management may be categorized under Advisor Community Services. By continuing the process of functional decomposition into sub categories and sub categories, and so on, critical elements may be defined and thereby identifying efficient architectural components to support each element of comprehensive financial planning information processing and communication.

Each functional component of the system may comprise basic architectural elements, such as communication and information flow processing, for example. Some components require high-speed communication while others do not. Some require time critical processing (on-line); others only require hourly, daily, or even weekly information processing (electronic mail delivery). In short, no one technological solution may efficiently and cost effectively provide for all the diversified needs of an electronic planning information system. However, by integrating several processing methodologies, the present invention provides a processing environment where all the components of a system may coexist.

One architecture for the present invention may include a central information-processing hub. This hub (which may be operated by the present invention or outsourced to a service supplier or other entity) may consist of a diverse range of multiprocessor computers, operating systems, relational databases, workflow processing systems, Internet Web servers and other elements. These support systems may be dedicated to specific processing and support tasks (e.g. e-mail, on-line query, etc.). Distributing tasks between separate small computer platforms may provide many benefits over a central large-scale computer. These benefits may include high performance at a lower price; ability to match the correct technology platform to each task; low cost scalability; flexibility of development platforms and development tools; minimal central point of failure so that if a single category of computer fails, only a small segment of total systems operations become inoperable; system performance malfunctions may be located and corrected easily; and new technological advances may be implemented in one environment without concern or redesign in another.

Likewise, communication links may be designed and implemented for specific processing categories (ISDN links, T1 links, Internet connections, etc.). For many of the user community, the communication infrastructure may centralize through the Internet. This method may allow remote sites on a worldwide basis to have access to the present invention without the need for high cost leased line connections. In addition, the specific processing requirements of remote clients may determine the method of connection. For example, 28.8 Kbps, analog modems, modem pools, or even through 128 Kbps ISDN digital connections may be specified. However, clients who require higher performance connections may be provided direct leased line circuits. Other variations may also be implemented.

Benefits of using the Internet for basic connectivity infrastructure may include immediate connectivity worldwide; interoperability of platforms; speed of system implementation; lower cost of implementation and operation; easier to create customer interest and sale; higher levels of security than via other network connection alternatives; and other benefits. Further, other modes of communication may also be implemented.

The present invention may employ one or more of the following elements: Thin Client Design techniques, Information Agent Middleware, Automatic customization of services by logon id, client history concept and other elements. Other options may also be implemented.

Thin Client architecture may employ the use of Web Browsers at the client location (e.g., the CFP office) for GUI presentation of system services. Proprietary application functionality may be implemented at the server location(s) within the present invention. This design feature may eliminate the need to dictate minimum hardware or software platform requirements to the customer (thereby reducing upgrade cost issues or possible sales restrictions) while also drastically reducing the cost of maintenance, version control and deployment of the application itself as compared to other design alternatives such as older client server techniques where part or all of the application was distributed to the client location, since only one copy of the application software (in the server location) needs to be administered. A potential client may only have sufficient technology to connect to the Internet and execute a Web Browser.

Having connected to the present invention using the desktop Browser and Internet supplied connectivity, the client may access application facilities through a standardized, point and click interface implemented at the server location and distributed to the desktop via XML, HTML, JAVA and ACTIVE-X types of facilities. Other options may be implemented.

With respect to Information Agent Middleware, many of the core application services provided by the present invention may be supplied by creating OEM arrangements with "best of class" applications, which already exist. By leveraging OEM arrangements with these kinds of systems vendors where possible, the present invention may reduce startup, development and maintenance costs as well as creating a flexible, low risk architectural design structure. For key application components, the present invention may establish exclusive arrangements for the functionality provided.

As to Automatic customization of services by logon id, each individual end user may log on to the present invention via a unique user id/password pair. This unique identification may be used by the present invention to automatically customize the service selection available to that user as appropriate to their specific requirements and level of authorization. Users may have access only to the services, functions and data for which they have a legitimate need, including screens, buttons on screens, data ranges, financial information, etc.

As to the Client History concept, the basic unit of data in the present invention architecture may be the client. Activities performed by the various categories of advisor may include first selecting an 'object' (the client) and then an 'activity' (the process to be performed for that client, such as building or modifying a financial plan). Each action performed and any data or information created by that action may be associated within the system with the specific client for which the action was performed. This creates a detailed audit trail for every client of each action performed, the results of the action, which user performed each activity and when, and other information. The collection of all information stored in the system for a given client may be referred to as client history which may be archived indefinitely for reference by authorized members of the present invention user community. The client history can be kept in offline storage until needed, thereby eliminating security issues which may result from unauthorized access. The client history may serve as a communication, reference and information storage device which may optimize many of the workflows involving the financial planning process and other processes.

The system architecture of the present invention may be constructed upon one or more of the following feature strategies. The present invention may have the ability to confront a specific subset of an entire marketplace domain. This ensures that the application features and capabilities may match the needs of the target client community without being distracted by trying to be all things to all people. The system may also be easily sizable to client community needs. The system may also exhibit security capabilities. Further, the system may be easy to use and easy to modify to meet changing client requirements.

In order to be effective in the marketplace, a service supplier should be careful to focus its mission into a specific, well defined subset of the entire financial mission, for example. Frequently, examples of vertical product or service offerings fail to succeed due to lack of focus in the design of the product mission. This is particularly true for those products targeted toward the financial community (as opposed to the client subset of the marketplace) since procedures, policies and business practices vary widely from one company to the next, thereby forcing the service supplier to spend a great deal of time, money and business energy creating and maintaining tailored solutions for each client. The present invention avoids this potential problem by focusing its mission into specific areas and the associated process and information flows.

Scalability insures that the system design of the present invention may easily and cost efficiently accommodate itself to the widest possible variation in the processing volume required to support an individual client or the aggregate effects of a defined client population. This scalability may account for all or some components of the system architecture (such as the network, the task processing computers and the database storage media) and occur with little or no visibility to the client community. The present invention may be designed to incorporate the further scalability technologies into each of the key components of the system implementation.

As processing requirements increase with an increase in the subscriber population, each task computer may be segmented further by means of simple duplication. For example, if a primary Web page server supporting 4,000 pages reaches its maximum performance capacity, the task server processing may be split into two separate servers each supporting 2,000 pages. The Web server hardware platform may be upgraded to the latest high performance platform available, and the old task server can be utilized in other task processing areas. The present invention may provide immediate capabilities to supply scalable task processing computer equipment ranging from the smallest Windows/PC platforms up through and including the largest IBM mainframe platforms, for example.

Similarly, communication speeds may also need to be scalable—from the customer sites to the present invention, and from the present invention to the customer sites. To address this issue, the present invention may be prepared to implement several types of communication links. For most customers, the Internet connectivity will suffice. However, where customer needs dictate high volume data transfer, single ISDN connections or T1 leased circuits may be implemented. As with the task servers, as the user community grows so will the central connection system.

There may be a point at which adding additional high speed links reach a saturation point. For example, this point may be reached when the total bandwidth of all the communication links becomes larger than the bandwidth of the backbone. For example, if the main backbone of the hub site is running 100 Mbps Ethernet, and T1 links provide 1.5 Mbps, then after approximately 60 to 70 T1 links are added, the maximum throughput of the hub will be exceeded. This is assuming that all 70 T1 links are operating at 100% capacity, 100% of the time. Fortunately, there is another available segmentation step. The task server(s) can be separated into individual subnets. T1 links follow the same organization into corresponding subnets. Finally, each subnet can be linked through fiber optic cable and fiber optic bridges to provide a new backbone with 1,000 times the previous capacity.

Behind the communication architecture of the present invention may reside an scaleable computer processing power and communications topology. The communication core may bypass generic Internet Services Providers (ISPs) and connect directly with super ISPs, NAPs or other direct backbone links to the Internet. Bypassing generic ISPs may allow the present invention to implement nearly an unlimited number T1, T3 and fiber optic links. In addition to the distribution and subneting of information servers, the present invention may provide a scaleable communications topology that may achieve gigabit data transmission levels. Scaling from several to several hundred T1/T3 Super ISP links (and eventually fiber optic links) lines are bridged to 10 Mbps Ethernet channels. Each 10 Mbps Ethernet channel is directed to a single port on a 10 port Ethernet-to-Fast-Ethernet switch. 100 Mbps output from these switches are interfaced to a 10 port Fast-Ethernet-to-Fiber switch. Finally, the fiber channel may be connected to the fiber optic backbone for a total bandwidth of one gigabit/second for each communications segment. Initially, the present invention may implement only a small portion of a complete communication segment. As the user community grows, additional high speed links will be added to continue to extend communication bandwidth to the present invention.

The present invention may implement high level security services available to protect subscribers and application resources against unauthorized use. Communications may be encrypted and authenticated, and the integrity of the transmitted information may be verified quickly and transparently. System controls may be put in place to determine subscriber access to applications, Web pages, directories, discussion groups, databases and other areas. E-mail, real time and other communication may be made private by authenticating each party and encrypting the message traffic. Additional Data Level Security may ensure that each user is able to see and or modify only that information which they own or are authorized. Legacy system usage may be protected via applicable existing security systems. Additionally, no client data may be directly accessible via the web during periods when online collaborations for that client are inactive (all client information will be contained in offline storage during these periods).

Figure 7:
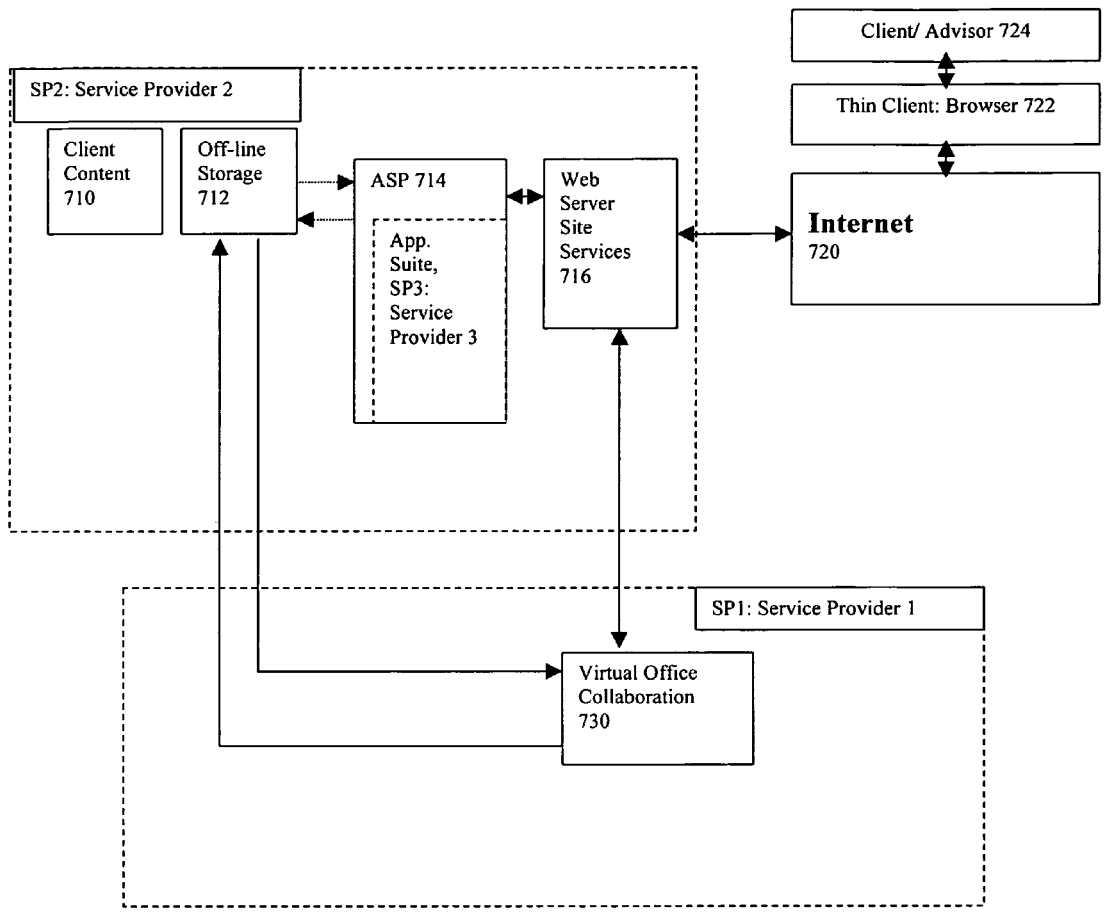
FIG. 7 is a site diagram, according to an embodiment of the present invention.

FIG. 7 illustrates an example of a site diagram according to an embodiment of the present invention. Service Provider 1 may comprise Virtual Office Collaboration 730 which communicates with Web Service Site Services 716 and Off-Line Storage 712, both residing on Service Provider 2. Client information may be stored in Client Content 710. Application Service Provider 714 may support financial applications. Client or Advisor 724, through Browser 722 may access the system via the Internet 720. Other variations exist.

The present invention may implement a layered security environment. These levels of communication security may provide the subscriber community with a high level of remote system data security.

Level 1. The present invention may implement Internet address authentication through a hardware firewall located at a Tech Center. Internet traffic not specifically enrolled in services of the present invention may be refused access to secure areas of the present invention. In addition, assigned subscriber names and passwords will be authenticated against the specific Internet address and master subscriber lists of the present invention.

Level 2. Upon enrollment, subscriber access may be determined as to the specific areas of information services of the present invention that may be made available. Requests to certain services areas may be restricted based on the initial security service enrollment. In addition, access to second level security areas will require a second password which may again be authenticated against the subscriber's Internet address, subscriber name, password, and other information. Subscribers attempting to obtain access more than three times to a restricted area, or entering an invalid password, may have their transfers blocked at the firewall and their accounts immediately suspended. When an infraction occurs, the subscriber will be required to reestablish the account through direct re-enrollment through security services of the present invention.

Level 3. All data transfers (when authenticated) will be transferred using the highest level of data encryption available using RSA 128 bit key data encryption models, for example.

Level 4. For high levels of security interest (personal financial records, legal records, etc.), requests for data transfers may, at the subscriber's option, be queued for maintenance by a responsible advisor or other subscriber designee (such as legal guardian, spouse, etc.). Data transfers at this level may then request the approval of such designee. These transfers may include the initial load of the information from the offline data storage. In this way, the client may control which information is directly connected to the web.

Level 5. At the highest level of security, subscribers may optionally request level 5 security control. At this level, all previous security levels would need to be passed through (1-4), then a dial back call would be placed from the present invention to the subscriber.

The system at the requested site would have to respond with a security code and request message. Once the correct message was received, the requester's system would dial a dedicated line and the present invention may verify caller ID phone packet as to the orientation of the call. If all the components matched, the subscriber would be allowed transmission of the required information.

Other levels are possible.

An important aspect of the system architecture and application design of the present invention is the ability to achieve flexibility. For example, flexibility may include ease of use by the various user types involved in the financial workflows; ability to tailor services to meet all workflow or customer variations; ease of maintenance and support; ease of integration with existing legacy systems (such as advisor practice management systems); ability to modify the application suite to meet additional and future requirements; ability to coordinate, integrate and deploy a wide variety of additional (non-core) services via the framework (such as existing Web based information, forums and sites); ability to implement and tailor security measures that exceed those used in traditional approaches to control the client information, and other features.

Other embodiments and uses of the invention will be apparent to those skilled in the art from consideration of the specification and practice of the invention disclosed herein. The specification and examples should be considered exemplary only.

What is claimed is:

1. A computer implemented method for providing an electronic collaboration tool with which a financial services client and one or more financial services provider participants may interact, wherein the electronic collaboration tool is hosted on an information processing hub accessible to the financial services client and the financial services provider participants over one or more network communication links, the method being executed by one or more processors and comprising:

enabling authorization of one or more participants to access client data and documents stored in one or more databases coupled to the information processing hub, wherein the client data and documents are related to one or more services provided for the financial services client through the electronic collaboration tool, wherein the one or more authorized participants include at least the financial services provider participants;

enabling the financial services client and the authorized participants to submit client data and documents related to the services provided for the financial services client to the electronic collaboration tool, wherein the client data and documents submitted to the electronic collaboration tool are stored in the one or more databases;

enabling the financial services client to request one or more services from the financial services provider participants through the electronic collaboration tool; and enabling the financial services provider participants to provide the requested services for the financial services client through the electronic collaboration tool, wherein enabling the financial services provider participants to provide the requested services includes enabling bi-directional communication between each of the financial services clients and the financial services provider participants and further enabling multi-directional communication among the authorized participants, wherein the electronic collaboration tool is configured to enable the financial service provider participants:

(i) to access at least a portion of the stored financial services client data and documents according to the financial service provider participant's scope of authorization;

(ii) to modify one or more accessed documents via the electronic collaboration tool such that the one or more modified documents are accessible to the financial services client and authorized ones of the financial service provider participants through the electronic collaboration tool; and (iii) to store the one or more modified documents.

2. The method of claim 1, wherein the authorized participants comprise advisors of the financial services client.

3. The method of claim 1, wherein the authorized participants comprise one or more entities authorized by the financial services client to participate in the electronic collaboration tool, wherein participating in the electronic collaboration tool includes providing one or more of the requested services for the financial services client.

4. The method of claim 1, further comprising enabling the financial services client to define a scope of authorization for each of the authorized participants.

5. The method of claim 1, wherein the client documents comprise financial documents associated with the financial services client.

6. The method of claim 1, wherein the financial services participants comprise financial advisors of the financial services client.

7. The method of claim 1, wherein the client documents comprise client work product associated with the financial services client, wherein client the work product comprises one or more of documents, strategies, ideas, plans, correspondences, or communications associated with the financial services client.

8. The method of claim 1, further comprising enabling the financial services client to view input that one or more of the authorized participants provide to the electronic collaboration tool, wherein the input that the one or more authorized participants provide to the electronic collaboration tool comprises one or more of edits, analysis, or comments related to the client data or documents.

9. The method of claim 1, further comprising enabling the financial services client to define one or more triggering events and one or more alert mechanisms, wherein the alert mechanisms are used to send a notification to the financial services client in response to an occurrence of one or more of the triggering events, wherein the notification is sent over the network communication links.

10. The method of claim 1, wherein the databases include a client history database maintaining information related to one or more previous updates relating to the client data or the services requested by the financial services client, the method further comprising enabling the financial services client to access the client history database.

11. A computer implemented method for providing an electronic collaboration tool with which one or more service provider participants may collaborate with each other, wherein the electronic collaboration tool is hosted on an information processing hub accessible to the client and the service provider participants over one or more network communication links, the method being executed by one or more processors and comprising:

enabling the one or more service provider participants to receive authorization by a client to access client data and documents stored in one or more databases coupled to the information processing hub, wherein the client data and documents are related to one or more services provided for the client through the electronic collaboration tool; and enabling the authorized service provider participants to access the electronic collaboration tool, wherein, the electronic collaboration tool enables bi-directional communication between the client and each of the authorized service provider participants and further enables multi-directional communication among the authorized service provider participants wherein the electronic collaboration tool is configured to enable the service provider participants:

(i) to access at least a portion of the stored financial services client data and documents according to the service provider participant's scope of authorization;

(ii) to modify one or more accessed documents via the electronic collaboration tool such that the one or more modified documents are accessible to the client and authorized ones of the service provider participants through the electronic collaboration tool; and (iii) to store the one or more modified documents.

12. The method of claim 11, wherein the authorized service provider participants comprise advisors of the client.

13. The method of claim 11, wherein the authorized service provider participants comprise one or more entities authorized by the client to participate in the electronic collaboration tool, wherein participating in the electronic collaboration tool includes providing one or more of the requested services for the client.

14. The method of claim 11 further comprising enabling the client to define the respective scope of authorization for each of the authorized service provider participants.

15. The method of claim 11, wherein the client documents comprise financial documents associated with the client.

16. The method of claim 11, wherein one or more of the authorized service provider participants comprise financial advisors of the client.

17. The method of claim 11, wherein the client documents comprise work product associated with the client, wherein the work product comprises one or more of documents, strategies, ideas, plans, correspondences, or communications associated with the client.

18. The method of claim 11, further comprising enabling the authorized service provider participants to provide input to the electronic collaboration tool, wherein the input that the authorized service provider participants provide to the electronic collaboration tool comprises one or more of edits, analysis, or comments related to the client data or documents.

19. The method of claim 11, wherein the databases include a history database, the method further comprising storing activity of the authorized service provider participants associated with the electronic collaboration tool in the history database, wherein the activity relates to the services requested by the client.

20. A computer implemented system for providing an electronic collaboration tool with which a financial services client and one or more financial service provider participants may interact, the system comprising:

an information processing hub configured to host the electronic collaboration tool, the information processing hub accessible to the financial services client and the financial services provider participants over one or more network communication links, wherein the electronic collaboration tool includes one or more processing systems comprising one or more processors collectively configured to:

enable authorization of one or more participants to access client data and documents stored in one or more databases coupled to the information processing hub, wherein the client data and documents are related to one or more services provided for the financial services client through the electronic collaboration tool, wherein the one or more authorized participants include at least the financial services provider participants;

enable the financial services client and the authorized participants to submit client data and documents related to the services provided for the financial services client to the electronic collaboration tool, wherein the client data and documents submitted to the electronic collaboration tool are stored in the one or more databases;

enable the financial services client to request one or more services from the financial services provider participants through the electronic collaboration tool; and enable the financial services provider participants to provide the requested services for the financial services client through the electronic collaboration tool, wherein enabling the financial services provider participants to provide the requested services includes enabling bi-directional communication between the financial services client and each of the financial services provider participants and further enabling multi-directional communication among the authorized participants, wherein the electronic collaboration tool is configured to enable the financial service provider participants:

(i) to access at least a portion of the stored financial services client data and documents according to the financial service provider participant's scope of authorization;

(ii) to modify one or more accessed documents via the electronic collaboration tool such that the one or more modified documents are accessible to the financial services client and authorized ones of the financial service provider participants through the electronic collaboration tool; and (iii) to store the one or more modified documents.

21. The system of claim 20, wherein the authorized participants comprise advisors of the financial services client.

22. The system of claim 20, wherein the authorized participants comprise one or more entities authorized by the financial services client to participate in the electronic collaboration tool, wherein participating in the electronic collaboration tool includes providing one or more of the requested services for the financial services client.

23. The system of claim 20, wherein the processing systems are further configured to enable the financial services client to define a scope of authorization for each of the authorized participants.

24. The system of claim 20, wherein the client documents comprise financial documents associated with the financial services client.

25. The system of claim 20, wherein the financial services participants comprise financial advisors of the financial services client.

26. The system of claim 20, wherein the client documents comprise client work product associated with the financial services client, wherein the client work product comprises one or more of documents, strategies, ideas, plans, correspondences, or communications associated with the financial services client.

27. The system of claim 20, wherein the processing systems are further configured to enable the financial services client to view input that one or more of the authorized participants provide to the electronic collaboration tool, wherein the input that the one or more authorized participants provide to the electronic collaboration tool comprises one or more of edits, analysis, or comments related to the client data or documents.

28. The system of claim 20, wherein the processing systems are further configured to enable the financial services client to define one or more triggering events and one or more alert mechanisms, wherein the alert mechanisms are used to send a notification to the financial services client in response to an occurrence of one or more of the triggering events, wherein the notification is sent over the network communication links.

29. The system of claim 20, wherein the databases include a client history database maintaining information related to one or more previous updates relating to the client data or the services requested by the financial services client, the method further comprising enabling the financial services client to access the client history database.

30. A computer implemented system for providing a collaboration tool with which one or more service provider participants may collaborate with each other, the system comprising:
  an information processing hub configured to host the electronic collaboration tool, the information processing hub accessible to the client and the service provider participants over one or more network communication links, wherein the electronic collaboration tool includes one or more processing systems comprising one or more processors collectively configured to:
    enable the one or more service provider participants to receive authorization by the client to access client data and documents stored in one or more databases coupled to the information processing hub, wherein the client data and documents are related to one or more services provided for the client through the electronic collaboration tool;
    enable the authorized service provider participants to access the electronic collaboration tool, wherein the electronic collaboration tool enables bi-directional communication between the client and each of the authorized service provider participants and further enables multi-directional communication among the authorized service provider participants
    wherein the electronic collaboration tool is configured to enable the service provider participants:
    (i) to access at least a portion of the stored client data and documents according to the service provider participant's scope of authorization,
    (ii) to modify one or more accessed documents via the electronic collaboration tool such that the one or more modified documents are accessible to the client and authorized ones of the service provider participants through the electronic collaboration tool; and
    (iii) to store the one or more modified documents.

31. The system of claim 30, wherein the authorized participants comprise advisors of the financial services client.

32. The system of claim 30 wherein, wherein the authorized participants comprise one or more entities authorized by the financial services client to participate in the electronic collaboration tool, wherein participating in the electronic collaboration tool includes providing one or more of the requested services for the financial services client.

33. The system of claim 30, wherein the processing systems are further configured to enable the financial services client to define a scope of authorization for each of the authorized participants.

34. The system of claim 30, wherein the client documents comprise financial documents associated with the financial services client.

35. The system of claim 30, wherein the authorized service provider participants comprise advisors of the client.

36. The system of claim 30, wherein the client documents comprise client work product associated with the client, wherein client the work product comprises one or more of documents, strategies, ideas, plans, correspondences, or communications associated with the client.

37. The system of claim 30, wherein the processing systems are further configured to enable the authorized service provider participants to provide input to the electronic collaboration tool, wherein the input that the authorized service provider participants provide to the electronic collaboration tool comprises one or more of edits, analysis, or comments related to the client data or documents.

38. The system of claim 30, wherein the databases include a history database, the method further comprising storing activity of the authorized service provider participants associated with the electronic collaboration tool in the history database, wherein the activity relates to the services requested by the client.

39. A computer implemented method for providing an electronic collaboration tool with which a client and a plurality of financial services advisor participants of the client may interact, wherein the electronic collaboration tool is hosted on an information processing hub accessible to the client and the financial services advisor participants over one or more network communication links, the method being executed by one or more processors and comprising:
  enabling the client to submit personal and financial data and documents to the electronic collaboration tool, wherein the personal and financial data and documents submitted to the electronic collaboration tool are stored in one or more databases coupled to the information processing hub, wherein the one or more databases include a client history database;
  enabling the client to authorize one or more of the plurality of financial services advisor participants to access the personal and financial data and documents stored in the one or more databases, wherein the client can define a respective level of access to the personal and financial data and documents for each of the authorized financial services advisor participants;
  enabling the client to request one or more services from the authorized financial services advisor participants through the electronic collaboration tool, wherein the authorized financial services advisor participants can select one or more activities related to the requested services;
  storing activity of the authorized financial services advisor participants associated with the electronic collaboration tool in the client history database, wherein the activity stored in the client history database includes information related to at least one of the services requested by the client or the activities selected by the authorized financial services advisor participants; and
  enabling bi-directional communication between the client and each of the authorized financial services advisor participants over the network communication links and further enables multi-directional communication among the authorized financial services advisor participants over the network communication links,
  wherein the electronic collaboration tool is configured to enable the financial service advisor participants:
  (i) to access at least a portion of the stored personal and financial client data and documents according to the financial service advisor participant's scope of authorization;
  (ii) to modify one or more accessed documents via the electronic collaboration tool such that the one or more modified documents are accessible to the client and authorized ones of the financial service advisor participants through the electronic collaboration tool; and
  (iii) to store the one or more modified documents.

40. The computer implemented method of claim 39, further comprising:
  enabling the client to request an update of the client's files from one or more of the authorized financial services advisor participants, wherein the client's files include at least the personal and financial data and documents stored in the one or more databases; and
  enabling the client to define one or more personalized alerts in response to one or more triggering events, wherein one or more of the personalized alerts are sent to the client over the network communication links in response to an occurrence of one or more of the triggering events.

41. The computer implemented method of claim 39, further comprising:

enabling the client and the authorized financial services advisor participants to view and edit one or more documents related to the client, wherein the personal and financial data and documents stored in the one or more databases;

enabling the client and the authorized financial services advisor participants to view a summary of edits for the one or more documents, wherein the summary of the edits is stored in the client history database; and enabling the client and the authorized financial services advisor participants to engage in a real time online conference through the electronic collaboration tool.

* * * * *